United States Patent [19]

Lucas et al.

[11] Patent Number: 4,644,347

[45] Date of Patent: Feb. 17, 1987

[54] MULTIPLE FREQUENCY MESSAGE SYSTEM

[75] Inventors: Alfred R. Lucas, Coral Springs; Jerome C. Leonard, Plantation, both of Fla.

[73] Assignee: Motorola, Inc., Schaumburg, Ill.

[21] Appl. No.: 522,066

[22] Filed: Aug. 10, 1983

[51] Int. Cl.[4] .................. H01H 67/00; G08B 5/22; H04Q 7/00; H04B 7/00

[52] U.S. Cl. .................. 340/825.04; 340/825.44; 455/34; 455/54; 455/56; 379/57

[58] Field of Search .................. 358/194.1; 455/34, 56, 455/62, 33, 54; 340/825.44, 825.47, 825.48; 179/2 EC

[56] References Cited

U.S. PATENT DOCUMENTS 3,696,297 10/1972 Otero.
4,392,022 7/1983 Carlson .................. 358/194.1
4,392,242 7/1983 Kai .................. 340/825.44
4,399,555 8/1983 MacDonald et al. .................. 455/33

OTHER PUBLICATIONS

BPR 2000 Series Display Publication No. 68P81032C70-0, copyright 1982, by Motorola, Inc.
"A Guide to the Golay Sequential Code (GSC)" Publication No. R8-1-67 copyright 1982, Motorola, Inc.
"Selective Signalling for Portable Applications" Nelson, 28th IEEE Vehicular Technology Conference, Denver, Colo., Mar. 22-24, 1978.
Dimension 1000 Binary GSC Radio Pager Theory/Maintenance Manual Publication No. 68P81025C80-0, copyright 1983, by Motorola, Inc.

Primary Examiner—Ulysses Weldon
Assistant Examiner—Ralph Smith
Attorney, Agent, or Firm—Joseph T. Downey; Anthony B. Sarli; Donald B. Southard

[57] ABSTRACT

In the preferred embodiment the multiple frequency receiver comprises a decoder responsive to a transmitted coded message signal having a special code for designating that the message is being sent on the local frequency and which is also responsive to the absence of the special code which indicates that the signals are being transmitted on a designated nationwide frequency. The decoder includes a microprocessor which generates an output to turn on the local frequency channel element so that the pager may receive the local frequency when the special code is detected and generates a second output to turn-on a nationwide frequency channel element so that the receiver can receive a nationwide frequency when the special code is absent. This enables the pager user to transfer from his local city to another city without having to manually adjust the pager.

29 Claims, 9 Drawing Figures

INDIVIDUAL VOICE PAGE

TONE ONLY BATCH TRANSMISSION MODE

TONE AND DATA BATCH TRANSMISSION MODE

MULTIPLE FREQUENCY MESSAGE SYSTEM

FIELD OF THE INVENTION

The present invention relates to electromagnetic wave receivers and more particularly to an electromagnetic wave multiple frequency receiver with a frequency switching means which enables the receiver to selectively receive one of a plurality of frequencies.

DESCRIPTION OF THE PRIOR ART

Recently, there have been several proposals for paging systems operating over a number of different frequencies in view of the FCC proposals which include the concept of nationwide frequencies at 900 MHz and also the provision for transmitting paging messages on the subcarriers of the commercial broadcast FM stations (88-108 MHz). In the former proposal, a pager in a nationwide system will be required to receive the nationwide frequency as well as one of the other 37 frequencies presently allowed to the carriers. Presently, local paging on the nationwide frequencies is prohibited by FCC rules. In the latter case, there presently exist proposals to network the commercial FM broadcast stations, such that the message could be transmitted on different frequencies, corresponding to the frequencies of the area participating broadcasters, to cover more than one locality. Therefore, a subcarrier pager would be required to operate on a multitude of frequencies since the network would be formed of any number of commercial FM stations. With the approval of either or both of the aforementioned proposals, it will be desirable to provide a receiver which is capable of selectively receiving either the local frequency signal or the nationwide frequency signal or in the case of subcarrier transmission the commercial broadcast FM frequencies.

SUMMARY OF THE INVENTION

It is therefore an object of the present invention to provide an electromagnetic wave receiver which is capable of selectively receiving signals transmitted at a multiplicity of different frequencies.

It is another object of the present invention to provide an electromagnetic wave receiver which includes a frequency switching means which selects the frequency at which the receiver operates to receive a signal.

It is still another object of the present invention to provide an electromagnetic wave receiver having a frequency switching means which automatically selects the frequency at which the receiver operates to receive a signal.

It is yet another object of the present invention to provide a pager which automatically switches from a local frequency to a nationwide frequency and viceversa in accordance with a transmitted coded message signal.

In order to accomplish the aforementioned objectives according to the present invention, a receiver for receiving transmitted coded messages signals on a plurality of channels is provided. The receiver comprises a detecting means for detecting transmitted coded message signals and a selecting means responsive to the detecting means for automatically selecting one channel from the plurality of channels. The selecting means may further include manual switching means for selecting one channel from the plurality of channels which also overrides the automatic operation of the selecting means. The receiver may further comprise means for converting the transmitted coded message signals into understandable information, such as by way of a display device and/or an audio circuit.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENT

Figure 1:
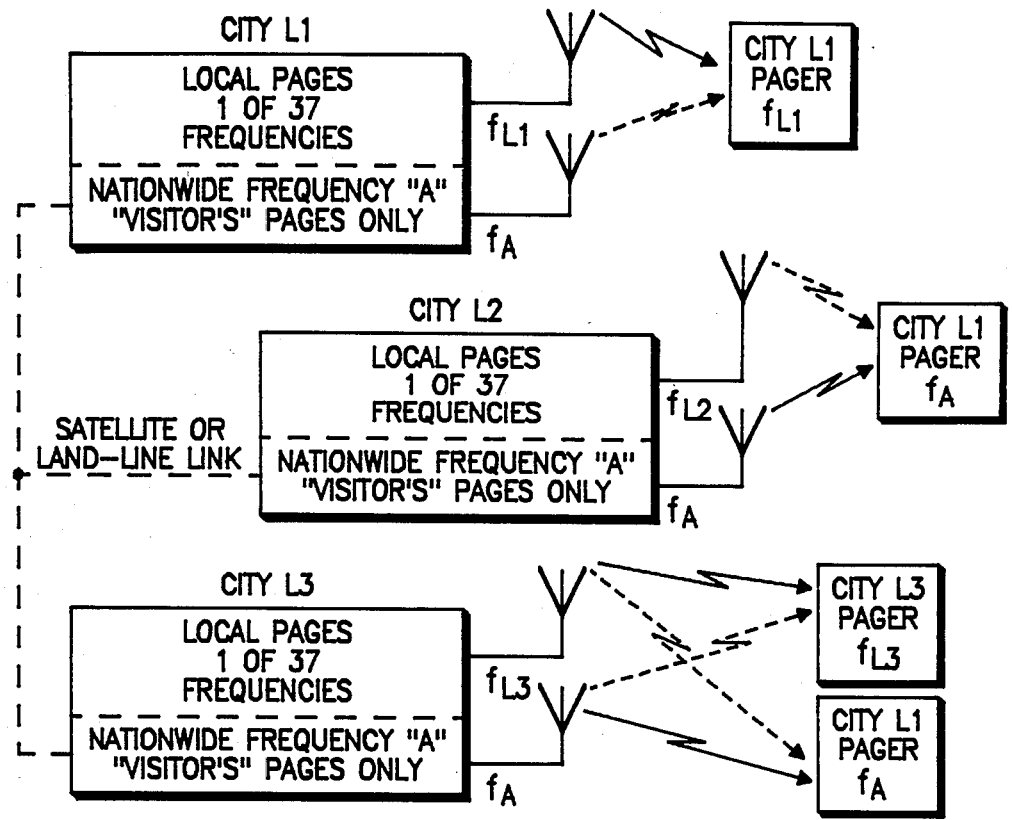
FIG. 1 is a block diagram illustrating the allocation of local pages and the nationwide frequencies in accordance with the present invention.

Referring now to the drawings, wherein like reference numerals designate identical or corresponding parts throughout the several views, and more particularly to FIG. 1 thereof, a basic diagram of the transmitter/receiver system contemplated for one of the three distinct nationwide paging frequencies in the 900 MHz band is shown. In this system, a single frequency "A" is used throughout the nation for messages intended for users who are traveling. But, by FCC restriction the user's messages may not be transmitted on the nationwide frequency if the user is in the user's home or local city. Thus, in order to avoid carrying two pagers/receivers, one for local and one for nationwide, a two frequency pager/receiver is advantageous. It is also anticipated that the nationwide system will be operated so that some or all of the Radio Common Carriers, hereinafter referred to as the RCC's, in a given city may place their users on the nationwide system. Thus a user subscribing to the nationwide system must be capable of receiving two frequencies, that of the user's "home city" for local pages, and one of the presently proposed three nationwide frequencies corresponding to the nationwide network to which the user belongs. In FIG. 1 only three cities or locations are shown and are indicated by L1,L2,L3, . . . LN, where the number N is a dynamic number which will increase as more locations are added. In a particular city, several RCC's on different frequencies may be a part of the network, each using its own local frequency for local transmissions. But again the nationwide frequency will be common.

In operation, a user in city L1 receives pages in that city on one of the 37 possible 900 MHz frequency band channels used locally. This frequency is determined by the user's choice of the RCC which services that city and belongs to the nationwide system. When the user leaves city L1, the user reports his absence to the local RCC, which then adjusts the system so that any pages originating for that particular user would be diverted to the nationwide system. The nationwide system then transmits the message in all cities, or in a specific city depending on the nature of the finally approved system. Thus, the user's pager must operate on frequency "A", the nationwide frequency, whenever the user is out of the home or local system.

One approach would be to have the user physically activate a switch to change the frequency of the paper when leaving the home or local system, but this requires the user to remember to take the appropriate action. Therefore, one consideration of the present invention is to eliminate the requirement of user action to accomplish the frequency switching, if desired. A method to accomplish the aforesaid automatic frequency switching operation is to add information to the signalling used on the channel to indicate to the receiving pager whether it is in its home city or not in its home city.

While it is clear that many types and formats of signal coding may be utilized for the present invention, the preferred embodiment utilizes a digital signal system designated as the Golay Sequential Code. The Golay Sequential Code (GSC) is a selective call paging protocol based largely on the current Golay binary paging format. A full description of the Golay code may be found in a publication entitled "A Guide to the Golay Sequential Code (GSC)" by Motorola, Inc., Publication No. R8-1-67, Copyright 1982, and also in a paper entitled "Selective Signalling for Portable Applications" by Leonard. E. Nelson, 28th IEEE Vehicular Technology Conference, Denver Colo., Mar. 22-24, 1978. The Golay Sequential is an NRZ binary signalling format that has been greatly modified from an earlier format to accommodate intermixed tone only, tone and data, as well as tone and voice paging and now improved battery saving.

The GSC is an asynchronous paging format which allows pages to be transmitted individually or in batches. Maximum message throughput for tone only and tone and data pages is achieved in the batch transmission mode; while the individual call mode is useful in tone and voice paging. It will be appreciated that the message transmission code need not have an an asynchronous format as a synchronous code format would also work well for the present invention.

Normally, the single call address format consists of a preamble, a start code (SC), an address code (ADR), and for voice paging, an Activation Code (AC). The preamble serves to divide pagers within the system into groups for improved battery life, as well as to uniquely identify GSC transmissions from other coding schemes to facilitate channel sharing without sacrificing battery life or false call integrity. The start code delimits the end of the preamble and it supplies timing information for the batch mode decoding. The address uniquely identifies each pager and the activation code (AC) is used to control the pager audio circuits in voice paging. The batch mode of operation, initiated by an inverted preamble, allows a string of addresses to be transmitted following the start code.

A data message consists of an address followed by one or more data blocks. Data messages may be transmitted individually in the single call mode or intermixed with address only pages in the batch mode of transmission. Address and data blocks are exactly the same length. The address information is constructed from words selected from the Golay (23, 12) cyclic code while the data information is encoded using the (15, 7) BCH code. Address information is transmitted at 300 bits/second while data information is transmitted at 600 bits/second.

In addition to enabling papers to operate in a battery saver mode, the preamble code signal identifies the transmission mode as single call or batch. For instance, when the preamble words are transmitted with one predetermined bit sequence, the single call mode is identified; if the preamble bit sequence is inverted, the batch mode is indicated.

The start code (SC), activation code (AC) and address code (ADR) all use a two word format consisting of 28 bits of comma followed by two (23, 12) code words. The comma is a 1, 0 bit reversal pattern transmitted at 600 bits/second. The two Golay code words (Word 1 and Word 2) are separated by a ½ bit space. The polarity of the ½ bit space shall be opposite the first bit of the second word and the starting comma bit must be of the same polarity as the first bit of the first word. The start code (SC) and activation code (AC) are predetermined for the preferred system. Word 2 of the start code (SC) and activation code (AC) are the inverses of the fixed words.

The address format (ADR) is identical to the start code (SC) and activation code (AC) formats regarding the number of bits, the rules for comma and the ½ bit space. The address Word 2 may be chosen from any word of the (23, 12) code set except the all 0's and all 1's combinations. Thus, there are 4094 potential second words made up of 12 information bits and 11 parity bits. The first words are chosen from a 100 word subset of the Golay code. To generate the binary bit patterns for the (23, 12) Golay code, the decimal representation of the code word is converted to binary. This binary representation is rewritten LSB to the left.

The format of the special code (SPC) used to provide channel identification information is identical to the start code (SC), activation code (AC) and address code (ADR) regarding the number of bits, the rules for comma and the ½ bit space. The one or more WORD 1's assigned for the special code (SPC) are selected from the group of previously unassigned Golay WORDS 1's, while WORD 2 of the special code (SPC) may be any of the 4094 possible 12-bit code words.

Tone only pages are those pager addresses which don't involve a voice message. Although the single call mode can be used, the batch mode of operation is the preferred method of address transmission for tone only and tone and data pages. The activation code (AC) is generally not used in tone only paging, but it may be and an extended batch mode is specifically useful in the high traffic periods.

The batch transmission format begins with an inverted preamble followed by the start code (SC) and up to 16 pager addresses or data blocks, although in the extended batch mode additional addresses and/or data blocks may be transmitted. The arriving page requests should be grouped as a function of preamble and transmitted on a time or traffic basis at the discretion of the terminal manufacturer and his customer.

The GSC format allows data pages to be intermixed with tone only or tone and voice pages. A data page consists of a pager address followed by one or more data blocks. A data block is identical in length to an address block and may be freely substituted for addresses in the batch operating mode. The single call mode can also be used by following the pager address with a data message. Data information is transmitted at 600 BPS to minimize the cross falsing probability between addresses and data.

A better understanding of transmitters and receivers utilizing the GSC code may be obtained by referring to the following U.S. patent applications now issued and which are incorporated by reference herein:

ENCODER FOR TRANSMITTED MESSAGE ACTIVATION CODE, to Fennel et al., U.S. Pat. No. 4,427,980, issued Jan. 24, 1984;

DECODER FOR TRANSMITTED MESSAGE ACTIVATION CODE, to Fennel et al., U.S. Pat. No. 4,424,514, issued Jan. 3, 1984;

ENCODER FOR TRANSMITTED DEACTIVATION CODE, to Bailey et al., U.S. Pat. No. 4,431,991, issued Feb. 14, 1984; and DECODER FOR TRANSMITTED MESSAGE DEACTIVATION CODE, to Bailey et al., U.S. Pat. No. 4,423,416, issued Dec. 27, 1983.

Figure 2A:
FIGS. 2A through 2C are timing diagrams for the encoded message system in accordance with the present invention.

FIG. 2A shows the the timing diagram for the preferred embodiment of the message signaling routine of the voice page format for the present invention. FIG. 2A shows that a preamble code signal is transmitted followed by a start code (SC), a special code (SPC) to identify the signal as a local or home city frequency and the address (ADR) of the individual pager. The address (ADR) is followed by an activation code (AC) and it is preferrably upon the reception and detection of the activation code (AC) that the individually addressed pager will commence its alert mode to warn the pager user of the presence of a subsequent voice message. At the conclusion of the variable length voice message, the preferred embodiment shows the inclusion of a deactivation (DC) code which for the preferred embodiment is the second detected occurence of the activation code (AC) and results in muting the audio channel. The addition of the special code (SPC) enables each pager to determine which frequency channel it should operate on.

Figure 2B:
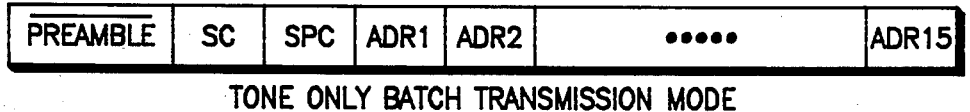

FIG. 2B is a signal timing diagram illustrating the use of the special code (SPC) in conjunction with the tone only batch transmission mode. FIG. 2B shows that for the preferred embodiment an inverted preamble signal is broadcast followed by the start code (SC), the special code (SPC) and a series of up to 15 distinct addresses for various pagers. The inverted preamble is used as an indicator in the preferred embodiment of the presence of more than one address and that the pager maintains the receive operation so that it will look for more than one address. In this embodiment, the special code (SPC) is a unique address word which is assigned to each city or each region participating in the nationwide paging system. The special code (SPC) is placed in the first address slot in the batch transmission mode. The software for the microprocessor 40 is designed to recognize that the first address slot is reserved for the special code (SPC) which will be explained in more detail later.

Figure 2C:

FIG. 2C illustrates that the special code (SPC) may also be used in the tone and data batch transmission mode.

Referring again to FIG. 1, a general description of the operation of a pager system using the "special code" in a GSC code transmission is provided hereinafter. Each pager in the system is programmed via code plug to decode the "special code" assigned to its HOME city.

In FIG. 1, the transmissions used in city L1 include special code L1, including transmissions on the nationwide system in city L1, and the transmissions used in city L2 include special code L2, etc. Assume a pager in city L1, programmed for that city, is turned on and initiates operation on the local frequency ($f_{L1}$) with the HOME city frequency being the turn-on or default condition. The pager samples the coding being transmitted, repetitively detects special code L1, and therefore remains on the local frequency ($f_{L1}$). Now assume that the user of this pager travels to city L2. where $f_{L2}$ may be the same frequency as $f_{L1}$. The pager now finds special code L2 (i.e. the absence of code L1) in the transmissions and thus determines that it is not in city L1. The pager/receiver switches channels electronically to the nationwide frequency. ($f_A$) On the nationwide frequency, ($f_A$) the pager will also find special code L2. It should be noted that the pager does NOT have to decode special code L2; it only has to determine that the code does not contain special code L1 to stay on the nationwide frequency. ($f_A$) If the pager was operating on the nationwide frequency, ($f_A$) and it detected special code L1, it would conclude it was in city L1 and would revert back to the local frequency. ($f_{L1}$)

In the preferred embodiment, in order to provide stability, each of the transmitters refreshes the system by transmitting its special code, at least once every five minutes and the paper frequency selection decision is set to occur after three consecutive positive detects. It will be appreciated by those skilled in the art that the time period and number of detects are arbitrary in the preferred embodiment as the system would work just as well with only one detect. The pager will change frequency after fifteen minutes if it can't make a decision. When a user in city L1 turns his pager on in the morning it automatically initiates operation on its HOME frequency which is the default start-up condition. It immediately receives signals on its local frequency ($f_{L1}$) identified with its special code L1. Within the fifteen minute time period, there is channel activity or refreshment transmissions which result in the detection of special code L1 on a continuous basis. The pager receives the continuous detection of special code L1, and it concludes that it is on the proper frequency by reception of its special code L1 in city L1.

Now assume the user boards a plane and travels to city L2 and does not turn the pager off. Sometime after take-off, the pager will not receive any signal. After fifteen minutes the pager which was operating on the local frequency ($f_{L1}$) does not detect any channel activity. At this point it switches to the nationwide frequency. ($f_A$) Since the user is in the air he is not receiving a signal on the nationwide frequency ($f_A$) either. After fifteen minutes of not receiving any codes, the pager switches back to the local frequency ($f_{L1}$) and repeats the process. When the user deplanes in city L2, assume there is another carrier in city L2 on the same frequency ($f_{L2}$) as the HOME city L1 frequency, but which is using special code L2. The pager because it is presently on the HOME city L1 frequency begins to detect a special code other than special code L1, determines that since it is not receiving its special code on its HOME city frequency, it is on the wrong frequency and it switches to the nationwide frequency. ($f_A$) It then begins to receive special code L2 on the nationwide frequency. ($f_A$) Within fifteen minutes and much faster, if there is considerable channel activity, the pager determines that it is on the proper frequency. It stays on the nationwide frequency ($f_A$) in city L2 until it detects the special code L1 three consecutive times, which will only occur if it is back in city L1, or in the event there is no channel activity for fifteen minutes.

The same user may travel to city L3 where again the pager which is initially operating on the local frequency ($f_{L1}$) does not detect any channel activity. This time, however, because no city L3 local frequency ($f_{L3}$) corresponds to the frequency of the user's pager operating on local frequency ($f_{L1}$). Again, the special code for city L1 is not detected, and the pager switches to the nationwide frequency ($f_A$). The pager does not detect the special code L1, therefore, within 15 minutes or much faster, if there is considerable channel activity, the pager determines it is now on the proper frequency. Meanwhile, a second user with a pager on special code L3 will remain on the local frequency, $f_{L3}$, as the pager has determined it is operating on the proper frequency.

It should also be appreciated that other code modifications such as a unique preamble for each city, a unique start code (SC) for each city or a unique binary word appended within the preamble may readily be adapted to select the frequency on which the paper operates.

Figure 3:
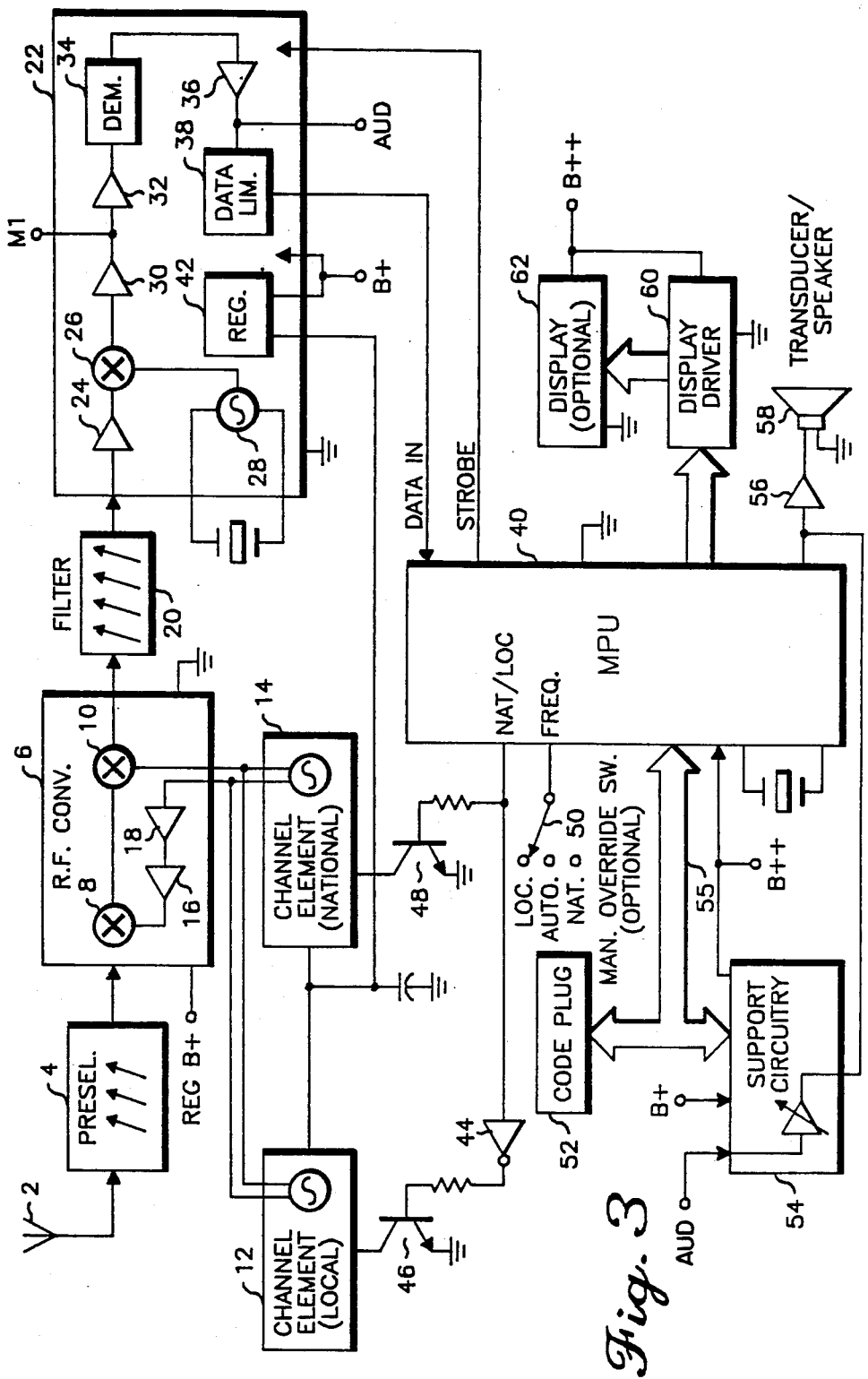
FIG. 3 is a functional block diagram of one embodiment for the receiver of the present invention.
Figure 4A:
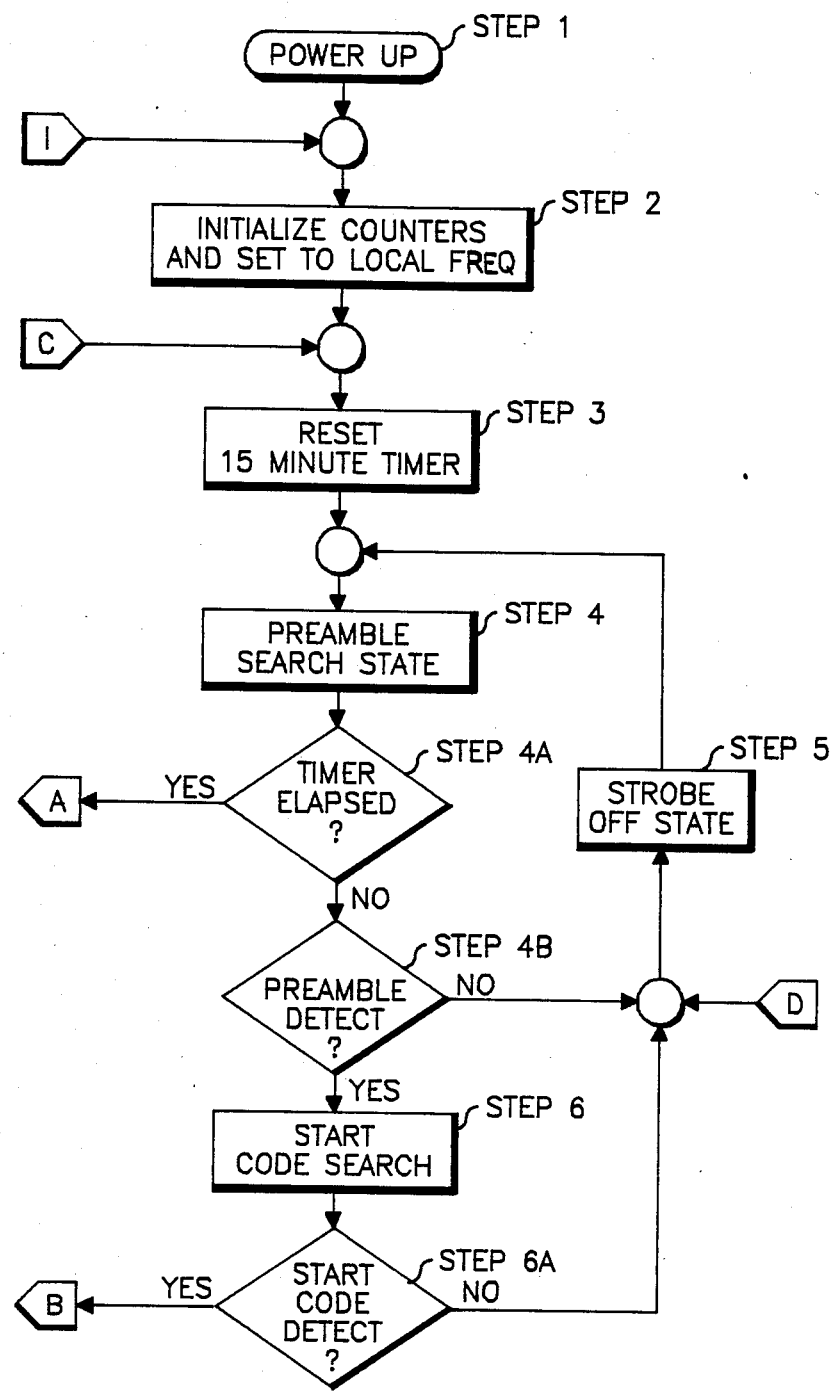
FIGS. 4A through 4D illustrate a flow chart for the microprocessor of FIG. 3.
Figure 4B:
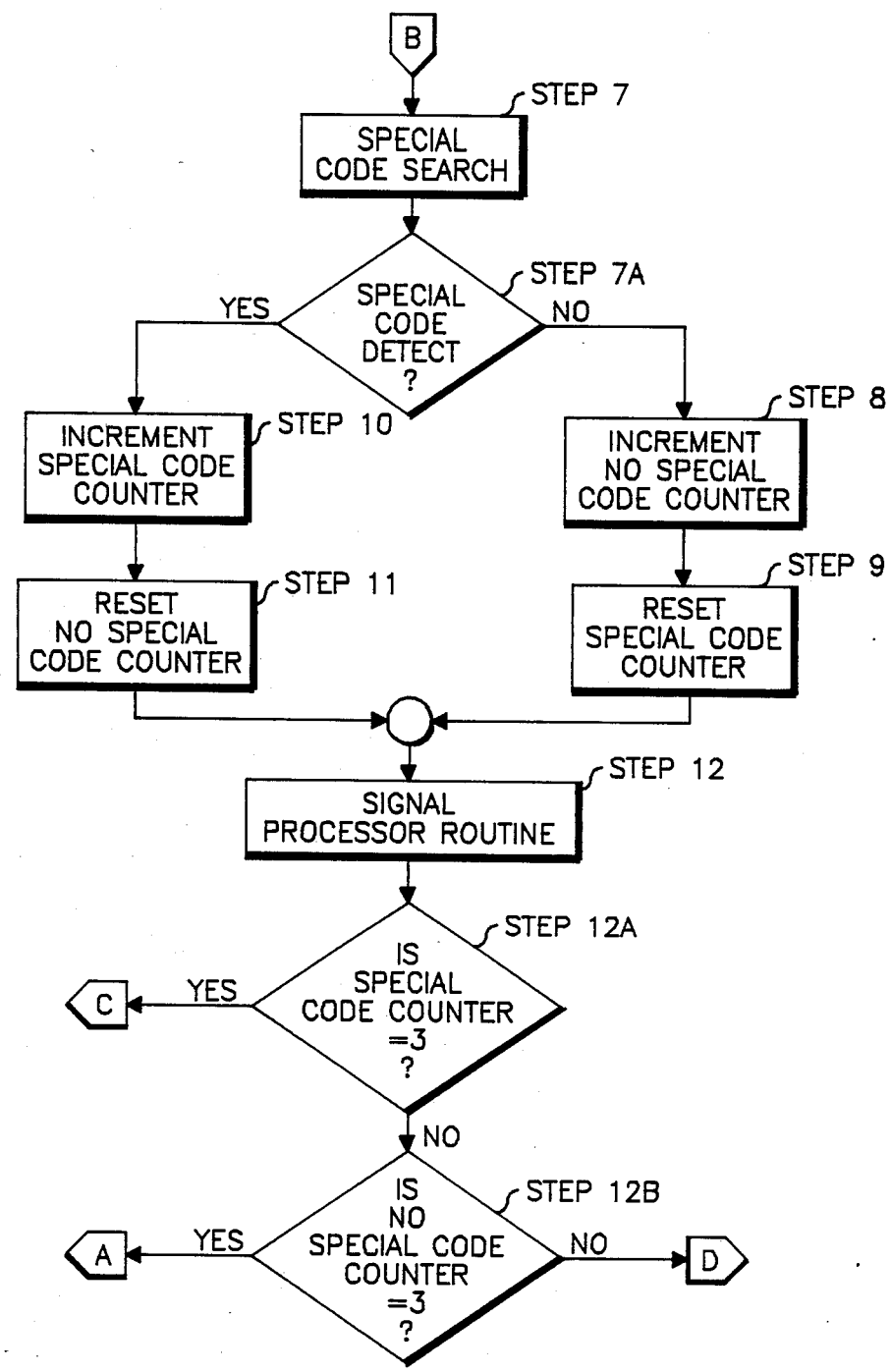
Figure 4C:
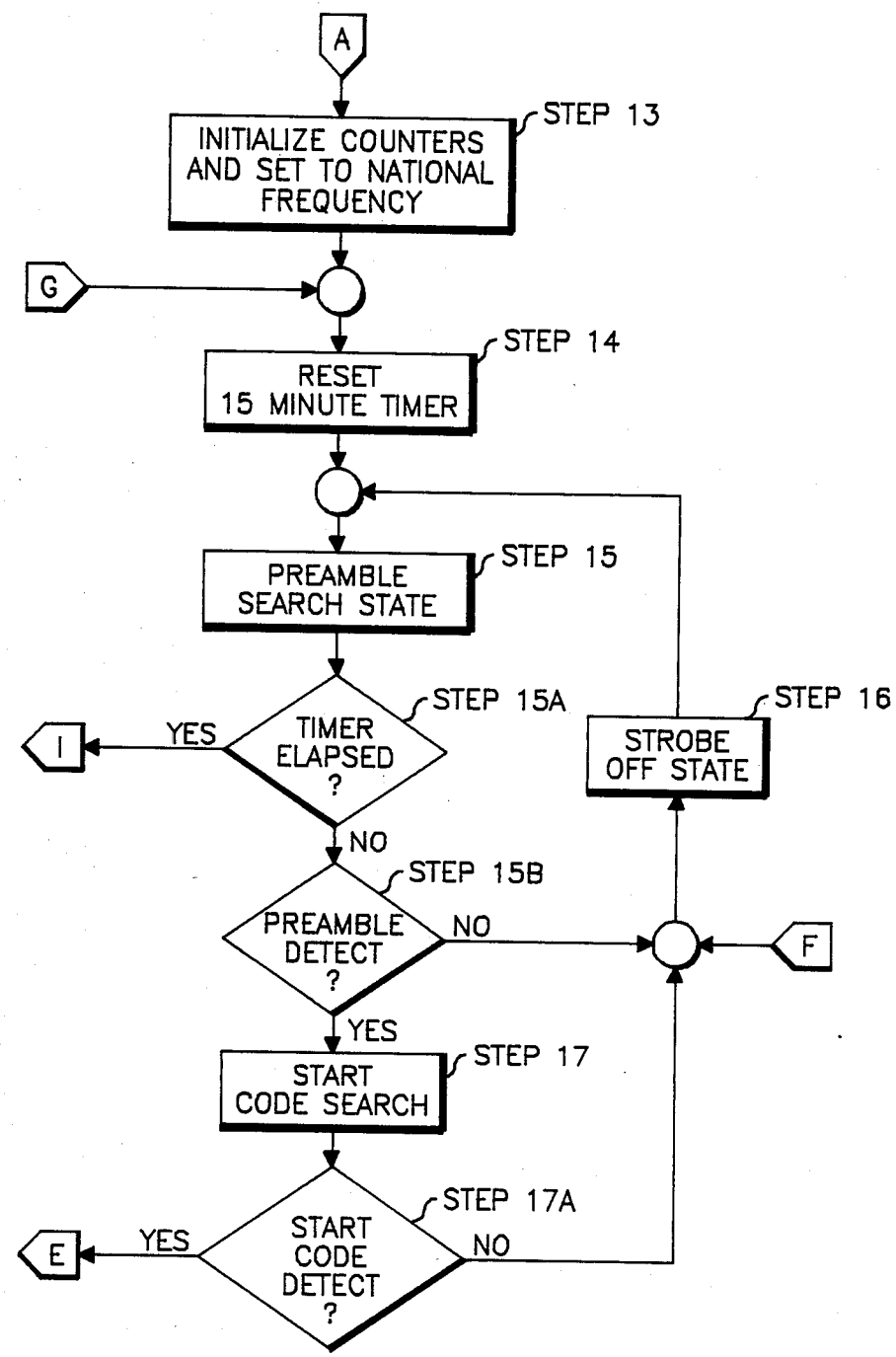
Figure 4D:
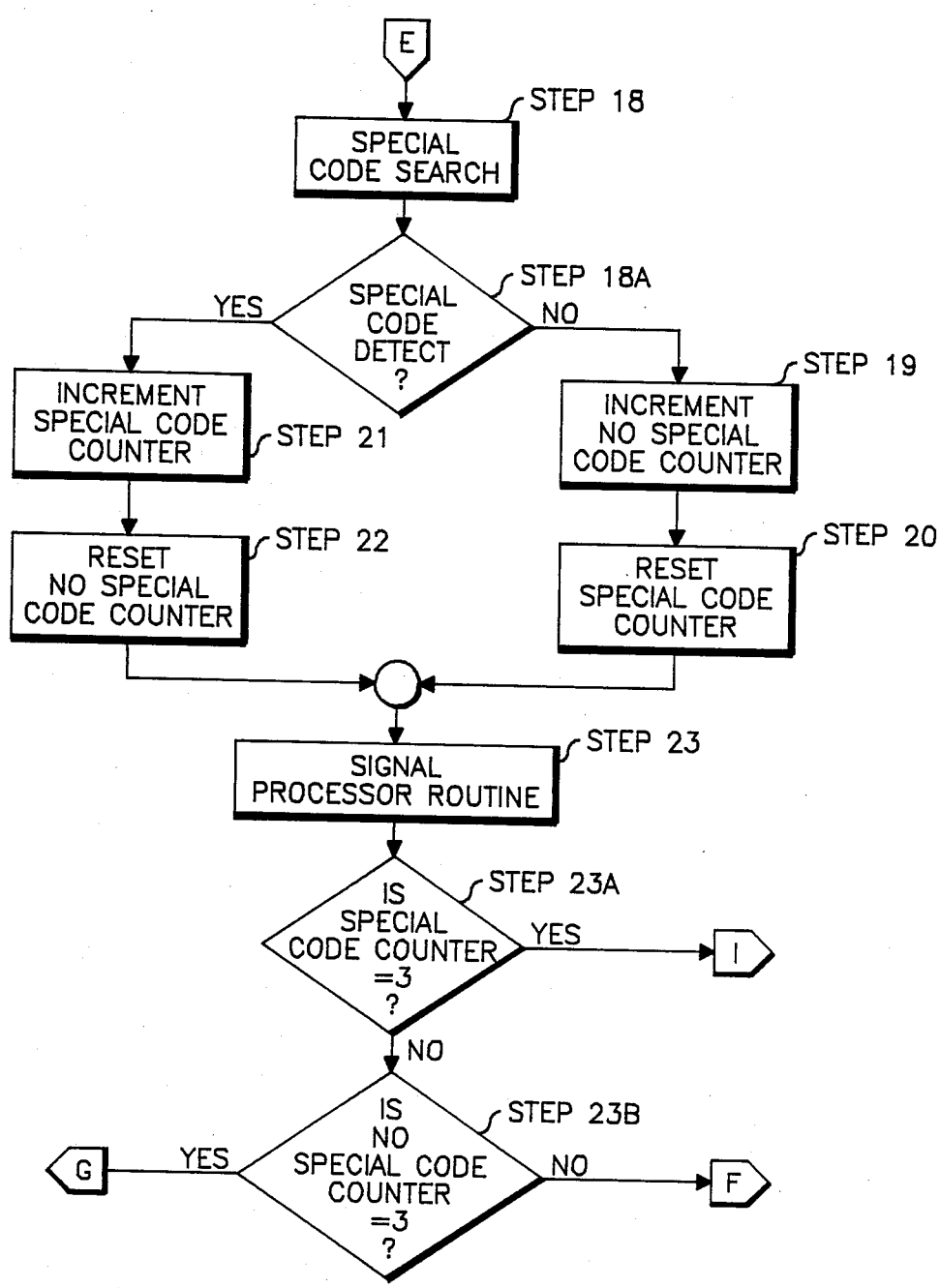

Referring now to FIG. 3, the antenna 2 is shown connected to the preselector 4 which is comprised of a three pole filter and used to pass signals of desired frequencies. The preselector 4 is connected to the RF converter 6 which is comprised of the series connected first and second mixers 8 and 10, the first mixer 8 being connected to the respective outputs of the local channel element 12 and national channel element 14 through the frequency multipliers 16 and 18 and the second mixer 10 being connected to respective outputs of the local channel element 12 and the national channel element 14. The local channel element 12 is naturally tuned to the user's local designated frequency, while the national channel element 14 is tuned to one of the three national paging frequencies. Therefore, the two channel elements 12 and 14 provide for the frequency selection by the RF converter 6. Each output of the channel elements 12 and 14 provides the necessary harmonics of the oscillator fundamental frequency to convert the incoming carrier frequency to a fixed intermediate frequency by the RF converter.

While in the preferred embodiment two channel elements have been shown, it is readily apparent to those skilled in the art that a frequency synthesizer may be used to select the frequency at which the receiver operates. An example of a sophisticated synthesizer utilized in a portable transceiver is an MX 300S transceiver manufactured by Motorola, Inc. Furthermore, the channel elements 12 and 14 as well as the frequency synthesizer, may also be designed to operate to receive subcarrier frequencies from commercial broadcast FM stations.

The output of the RF converter 6 is connected to a filter 20 which is used to filter the intermediate frequency signal from the RF converter. The output of the filter 20 is connected to the low conversion and detection circuitry 22 which includes the amplifier 24 having its output connected to an input of the mixer 26 having its other input connected to the oscillator 28. The output of the mixer 26 is connected to the series connected amplifier combination 30 and 32 which has its output connected to the demodulator 34. The output of the demodulator 34 is connected to the input of the amplifier 36 which amplifies the signal from the demodulator 34. The output of the amplifier 36 is connected to the input of the data limiter 38 which has its output connected to the data input port of the microprocessor 40. The channel elements 12 and 14 are driven by the regulated voltage from the voltage regulator 42 which is also included in the low frequency converter and detection circuitry 22. The low frequency converter and detection circuitry 22 is utilized to recover the modulation signal from the RF carrier wave, the operation of which is readily understandable to those skilled in the art.

The microprocessor 40 such as an MC146805E2 with 4K external ROM (not shown) manufactured by Motorola, Inc., includes a NATIONAL/LOCAL output port which is used to control the switching of the local channel element 12 and the national channel element 14. The NATIONAL/LOCAL output port of the microprocessor 40 is connected to the input of the local channel element 12 through the inverter 44 and NPN transistor 46 and also to the national channel element 14 input through the transistor 48. When the output of the NAT/LOC output port of the microprocessor 40 is at a 1 logic level, the collector of the transistor 46 is floating or in a high impedance state and the collector of the transistor 48 is at its saturation voltage (i.e. virtual RF ground) so that power is being supplied to the national channel element 14. However, when the NAT/LOC port is at a 0 logic level, the collector of the transistor 48 is floating or in a high impedance state and the collector of the transistor 46 is at virtual RF ground so that power is supplied to the local channel element 12 and the national channel element 14 is turned off. Two additional input ports of the microprocessor 40 may be connected to the optional manual override switch 50 which is used to manually select either the local frequency, the national frequency or the automatic selection of the proper frequency, as desired by the user. The read only memory designated as a code plug 52 provides address information for the individual receiver as well as the special code information for use by the microprocessor 40.

The microprocessor 40 is coupled to and supplies signals to support circuitry 54 through data bus 55. The support circuitry 54 such as a Motorola support module. Part No. 51-05192E57, amplifies the audio signal from the low frequency converter and detection circuitry 22 to the amplifier 56 and transducer/speaker 58. The amplifier 56 is also connected to the output port of the microprocessor 40 which provides an alert output, and amplifies the alert output to the transducer/speaker 58. The support circuitry 54 includes a "deadman" timer to prevent the microprocessor 40 from staying in an undetermined state in the event it gets lost. The support circuitry 54 also includes a DC to DC converter to supply the microprocessor 40, display driver 60 and display device 62 with the proper operating voltage. The support circuit 54 also monitors user inputs such as the volume control switch, on/off switch, the read page switch and provides information to the microprocessor 40 regarding the status of the aforesaid switches.

The microprocessor 40 is also connected to the input of the optional display driver 60 which is used to control the optional display device 62. The display device may be used to display the status of the receiver as to whether it is on the local channel, the national channel or searching for the appropriate channel to operate on. Another output port of the microprocessor 40 is used to strobe the low frequency conversion and detection circuitry in the battery saver mode in order to consume less energy.

FIGS. 4A through 4D represent the flow chart for the firmware operation of the microprocessor shown in FIG. 3. The operation of the receiver, which in this embodiment is capable of receiving two different frequencies, commences with the detection of powerup which occurs when the receiver is initially turned on. During the power-up and initialization operations the microprocessor 40 is made ready for its decoding operation. Part of the initialization process includes initializing prescribed counters and setting the receiver to respond to the local frequency.

After initialization, the microprocessor is ready to receive information from the receiver and to decode the signals which are received. For the preferred embodiment these signals are digitally encoded words in the predetermined format of the Golay Sequential Code as described earlier. After the counters are initialized and the frequency is set to the local frequency by energizing the local channel element 12 (FIG. 3), a fifteen minute timer is also reset as shown in step 3. In step 4, the receiver is in the preamble search state where in step 4a the microprocessor first determines if the 15 minutes on the 15 minute timer has elapsed. If the time has not elapsed the routine proceeds to step 4b where it is determined if a preamble has been detected by correlating the preamble with the information stored in the code plug 52. If no preamble has been detected the program proceeds to step 5 where the microprocessor generates a strobe off signal at the output port in order to disable the power to the receiver portions 6 and 22 of the device as shown in FIG. 3. The program then returns to steps 4 where the microprocessor generates a strobe on signal which enables power to be restored to the receiver portions 6 and 22, and again checks the timer and searches for the preamble.

Returning now to step 4b, if a preamble has been detected, indicating that the signal is intended for the receiver, the program proceeds to step 6 where the microprocessor begins the start code search. Once in the start code search, if the start code has not been detected in step 6a the program returns to step 5 where the microprocessor 40 generates a strobe off signal again to disable power to the receiver portions 6 and 22 of the device and the program then returns to step 4 to search for a preamble again. If the start code is detected in step 6a, the program proceeds to step 7 where the microprocessor correlates for the special code as discussed earlier. In step 7a if the special code is not detected the no special code counter is incremented in step 8 and the special code counter is reset in step 9. On the other hand, if the special code is detected in step 7a, the special code counter is incremented in step 10 and the no special code counter is reset in step 11.

After both steps 9 and 11, the program proceeds to step 12 which executes a signal processor routine in which it is determined whether the special code counter is equal to three or not in step 12a. If the special code counter is equal to three the routine proceeds back to step 3 where the 15 minute timer is then reset and the routine continues to step 4, etc. However, if the special code counter is not equal to three the routine proceeds to step 12a where it is determined if the no special code counter is equal to three or not. If the no special code counter is not equal to three, the routine returns to step 5 where the strobe off state again is generated before proceeding to step 4, etc. If the no special code counter is equal to three, the routine proceeds to step 13 where the counters are again initialized and the receiver is set to receive the national frequency. The routine then proceeds to step 14 where the 15 minute timer is reset.

Steps 15 through 17a are essentially the same as steps 4 through 6a except that since the receiver is now set on a national frequency. If the 15 minute timer has timed out in step 15a, the counters are initialized and the receiver is switched to receive the local frequency in step 2 before returning to step 3. Also, if the start code is detected in step 17a, the program proceeds to step 18 where the microprocessor again searches for the special code. Steps 18 through 23b are essentially the same as steps 7 through 12b, except that in step 23a if the special code counter is equal to three, the routine returns to step 2 where the counters are initialized and the receiver is set to receive the local frequency. Further, if the no special code counter is equal to 3 in step 23b, the routine proceeds to step 14 where the 15 minute timer is reset. However, in step 23b if the no special code counter is not equal to three, the routine returns to step 16 where the receiver is in the strobe off state before beginning to search for the preamble again.

More concisely, the flow chart may be summarized as follows. Upon powering up the receiver, the pager is set to the LOCAL frequency and the 15-minute timer starts. Upon receiving 3 consecutive detects of the SPECIAL CODE (assuming correct preamble), the 15-minute timer is reset. If the correct preamble is received and the SPECIAL CODE is not detected three consecutive times OR after the 15-minute timer elapses, the pager is set to the NATIONAL frequency. The former condition will most likely occur when the user is not in the user's local/regional area and there is channel activity, while the latter will occur in areas where there is no channel activity.

After the pager is set to the NATIONAL frequency the 15-minute timer is started. After three consecutive non-detects of the SPECIAL CODE (assuming correct preamble) the 15 minute timer is reset. If the correct preamble is received and the SPECIAL CODE is detected three consecutive times OR the 15-minute timer elapses, the pager is set to the LOCAL frequency. The former condition will occur when the user is back in his local/regional area. The latter occurs in areas of no channel activity.

Therefore, as can be seen by the aforesaid description of the flow chart, the receiver is rendered operable in the desired manner as discussed earlier.

Obviously, numerous (additional) modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A multiple frequency message system, comprising:
   transmitter means for transmitting coded message signals on at least two channels in a plurality of geographic areas, said coded message signals including channel identification information, said transmitter means further transmitting said channel identification information at least once during a periodic transmitter time interval; and
   receiver means, capable of receiving transmitted coded message signals on said two channels, said receiver means including channel selecting means responsive to said channel identification information, said channel selecting means maintaining said receiver operation on the first channel when said channel identification information detected during a periodic receiver time interval is the same as predetermined channel identification information.

2. The multiple frequency message system according to claim 1 wherein said transmitter means includes timing means generating said periodic transmitter time interval and said receiver means includes timing means generating said periodic receiver time interval, said periodic transmitter time interval being equal to or less than said periodic receiver time interval.

3. A multiple frequency transmitter for transmitting coded message signals on at least two channels in a plurality of geographic areas, comprising:
   channel identification means for generating channel identification information;
   message accepting means for accepting and generating a formatted message;
   timing means generating a periodic transmitter time interval; and
   coded message formatting means coupled to said channel identification means and to said message accepting means for combining said channel identification information with said formatted message to obtain said coded message signals, said coded message formatting means further coupled to and responsive to said timing means,
   whereby said transmitter transmits said channel identification information at least once during each of said periodic transmitter time intervals.

4. The multiple frequency transmitter according to claim 3 wherein said transmitter transmits the same channel identification information on both channels in a given geographic area.

5. The multiple frequency transmitter according to claim 3 wherein said periodic transmitter time interval is equal to or less than the time interval during which a receiver must detect said channel identification information to maintain said receiver operation on the selected channel.

6. The multiple frequency transmitter according to claim 3 wherein the number of transmissions of said channel identification information occuring during said periodic transmitter time interval is equal to or greater than the minimum number of detections of said channel identification information required to maintain said receiver operation on the selected channel.

7. The multiple frequency transmitter according to claim 3 wherein said transmitter transmits different channel identification information on both channels in each different geographic area.

8. The multiple frequency transmitter according to claim 3 wherein said second channel is common to all geographic areas.

9. A receiver for receiving transmitted coded message signals on at least two channels, said coded message signals including channel identification information, comprising:
   detecting means for detecting transmitted coded message signals;
   decoding means responsive to said coded message signals for decoding said channel identification information; and
   channel selecting means responsive to said decoding means for maintaining said receiver operation on the first channel when said decoded channel identification information is the same as predetermined channel identification information, said channel selecting means further including timing means generating a periodic receiver time interval during which said channel identification information must be decoded.

10. The receiver according to claim 9 wherein said channel selecting means selects the second channel when said channel identification information decoded on the first channel in said periodic receiver time interval is different than said predetermined channel identification information.

11. The receiver according to claim 10 wherein said channel selecting means selects said first channel when said channel identification information decoded on said second channel in said periodic receiver time interval is the same as said predetermined channel identification information.

12. The receiver according to claim 9 wherein said channel selecting means includes manual switching means for selecting one channel from said first or second channels.

13. The receiver according to claim 9 further including means for indicating to the user the channel status of said receiver.

14. The receiver according to claim 9 wherein said predetermined channel identification information is stored within the receiver.

15. A method for selecting the channel on which a receiver having first and second channels operates to receive transmitted coded message signals, said transmitted coded message signals including channel identification information, comprising the steps of:
   presetting said receiver to said first channel wherein said receiver can detect and decode said transmitted coded message signals including channel identification information;
   correlating said channel identification information to predetermined channel identification information stored within the receiver;
   maintaining said first channel at which said receiver will operate in accordance with the results of said step of correlating when said channel identification information received is the same as said predetermined channel identification information;
   selecting said second channel when said channel identification information is not the same as said predetermined channel identification information; and
   periodically rechecking the results of said step of correlation to determine when said selected channel should be changed.

16. A nationwide multiple frequency, selective call message system comprising:
   multiple transmitter means for transmitting coded message signals on a plurality of channels in a plurality of geographic areas, said transmitter means including at least one common channel between said geographic areas, said coded message signals including both channel identification information and selective call messages, said transmitter means further transmitting said channel identification information at least once during a periodic transmitter time interval; and
   receiver means capable of receiving transmitted coded message signals on at least two channels of said plurality of channels, one of said channels being said common channel between said geographic areas, said receiver means including channel selecting means responsive to said channel identification information, said channel selecting means maintaining said receiver operation on the first channel when said channel identification information detected during a periodic receiver time interval is the same as said predetermined channel identification information.

17. The nationwide, multiple frequency, selective call message system according to claim 16 wherein said transmitter means includes timing means generating said periodic transmitter time interval and said receiver means includes timing means generating said periodic receiver time interval, said periodic transmitter time interval being equal to or less than said periodic receiver time interval.

18. A multiple frequency transmitter for transmitting coded message signals on a plurality of channels in a plurality of geographic areas, said transmitter including at least one common channel between said geographic areas, comprising:
   channel identification means for generating channel identification information;
   message accepting means for accepting and generating a formatted selective call message;
   timing means generating a periodic transmitter time interval; and
   coded message formatting means coupled to said channel identification means and to said message accepting means for combining said channel identification information with said formatted selective call message to obtain said coded message signals, said coded message formatting means further coupled to and responsive to said timing means,
   whereby said transmitter transmits said channel identification information at least once during each of said periodic transmitter time intervals.

19. The multiple frequency transmitter according to claim 18 wherein said transmitter means transmits the same channel identification information on said plurality of channels, including said common channel, in a given geographic area.

20. The multiple frequency transmitter according to claim 18 wherein said transmitter means transmits different channel identification information on said plurality of channels, including said common channel, in each different geographic area.

21. The multiple frequency transmitter according to claim 18 wherein said periodic transmitter time interval is equal to or less than the time interval during which a receiver must decode said channel identification information to maintain said receiver operation on the selected channel.

22. The multiple frequency transmitter according to claim 18 wherein the number of transmissions of said channel identification information occuring during said periodic transmitter time interval is equal to or greater than the minimum number of detections of said channel identification information required to maintain said receiver operation on the selected channel.

23. A receiver for receiving transmitted coded message signals, said coded message signals including both channel identification information and selective call messages, on at least two of a plurality of channels, at least one of said two channels being the common channel between geographic areas, comprising:
   detecting means for detecting transmitted coded message signals;
   decoding means responsive to said coded message signals for decoding channel identification information; and
   channel selecting means responsive to said decoding means for maintaining receiver operation on the first channel when said decoded channel identification information is the same as predetermined channel identification information, said channel selecting means further including timing means generating a periodic receiver time interval during which said channel identification information must be decoded.

24. The receiver according to claim 23 wherein said channel selecting means selects said common channel between said geographic areas when said channel identification information decoded on said first channel in said periodic receiver time interval is different than said predetermined channel identification information.

25. The receiver according to claim 24 wherein said channel selecting means selects said first channel when said channel identification information decoded on said common channel between said geographic areas in said periodic receiver time interval is the same as said predetermined channel identification information.

26. The receiver according to claim 23 wherein said channel selecting means further includes manual switching means for selecting one channel from said at least two of said plurality of channels.

27. The receiver according to claim 23 further including means for indicating to the user the channel status of said receiver.

28. The receiver according to claim 23 wherein said predetermined channel identification information is stored within said receiver and is different for each different geographic areas.

29. A method for selecting the channel on which a receiver having at least two channels selected from a plurality of channels, one of said channels including the common channel between a plurality of geographic areas, operates to receive transmitted coded message signals, said transmitted coded message signals including channel identification information and selective call messages, comprising the steps of:
   presetting said receiver to a first channel of said two channels wherein the receiver can detect and decode said transmitted coded message signals, said transmitted coded message signals including channel identification information;
   correlating said channel identification information with predetermined channel identification information stored within said receiver;
   maintaining said first channel of said two channels on which said receiver will operate in accordance with the results of said step of correlating when said channel identification information received is the same as said predetermined channel identification information;
   selecting said common channel of said two channels on which said receiver will operate with the results of said step of correlating when said channel identification information is not the same as said predetermined channel identification information; and
   periodically rechecking the reults of said step of correlation to determine when said selected channel should be changed.

* * * * *